US010836465B2

(12) United States Patent
Schlipf et al.

(10) Patent No.: US 10,836,465 B2
(45) Date of Patent: Nov. 17, 2020

(54) SLAT ASSEMBLY

(71) Applicant: Airbus Operations GmbH, Hamburg (DE)

(72) Inventors: Bernhard Schlipf, Hamburg (DE); Dort Daandels, Hamburg (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 345 days.

(21) Appl. No.: 15/821,823

(22) Filed: Nov. 23, 2017

(65) Prior Publication Data

US 2018/0141637 A1    May 24, 2018

(30) Foreign Application Priority Data

Nov. 23, 2016  (EP) .................................... 16200371

(51) Int. Cl.
| | |
|---|---|
| *B64C 9/02* | (2006.01) |
| *B64C 9/24* | (2006.01) |
| *B64C 13/34* | (2006.01) |
| *B64C 13/28* | (2006.01) |
| *B64C 9/22* | (2006.01) |

(52) U.S. Cl.
CPC .................. *B64C 9/02* (2013.01); *B64C 9/22* (2013.01); *B64C 9/24* (2013.01); *B64C 13/28* (2013.01); *B64C 13/34* (2013.01)

(58) Field of Classification Search
CPC ........... B64C 13/28; B64C 13/34; B64C 9/02; B64C 9/22; B64C 9/24
USPC ........................................................ 244/214
See application file for complete search history.

(56) References Cited

U.S. PATENT DOCUMENTS

| 4,753,402 | A | 6/1988 | Cole | |
|---|---|---|---|---|
| 8,276,852 | B2* | 10/2012 | Shmilovich | B64C 3/50 244/214 |
| 2007/0045477 | A1* | 3/2007 | Armstrong | B64C 9/22 244/214 |
| 2007/0102587 | A1* | 5/2007 | Jones | B64C 9/22 244/214 |

(Continued)

FOREIGN PATENT DOCUMENTS

EP          2390176          11/2011

OTHER PUBLICATIONS

European Search Report, dated May 24, 2017, priority document.

*Primary Examiner* — Claude J Brown
(74) *Attorney, Agent, or Firm* — Greer, Burns & Crain, Ltd.

(57) ABSTRACT

A main aircraft wing slat assembly comprising a slat and two elongate slat tracks. A drive arrangement drivingly engages the two slat tracks and effects parallel synchronous movement of the slat tracks between retracted and extended positions. The connection between the slat and one or both slat tracks is realized by an interconnection portion extending between at least part of the slat and at least part of the respective slat track. The interconnection portion is elastically deformable and constructed such that a first stiffness against deformation about a first axis, is at least ten times a second stiffness against deformation about a second axis, which extends perpendicularly to the first axis and between the first and second portions of the interconnection portion, and at least ten times a third stiffness against deformation about a third axis, which extends perpendicularly to the first and second axes.

17 Claims, 4 Drawing Sheets

(56) References Cited

U.S. PATENT DOCUMENTS

| | | | | |
|---|---|---|---|---|
| 2008/0271557 | A1* | 11/2008 | Hubberstey | B64C 9/24 74/422 |
| 2010/0163685 | A1* | 7/2010 | Vormezeele | B64C 9/22 244/214 |
| 2010/0258674 | A1* | 10/2010 | Sutton | B29C 43/12 244/123.1 |
| 2011/0168849 | A1* | 7/2011 | Parker | B64C 9/02 244/214 |
| 2011/0253832 | A1* | 10/2011 | Wildman | B64C 9/02 244/99.13 |
| 2011/0290946 | A1 | 12/2011 | Peirce | |
| 2012/0012712 | A1* | 1/2012 | Eden | B64C 3/28 244/201 |
| 2013/0126670 | A1* | 5/2013 | Vaghela | B64C 9/22 244/99.3 |
| 2013/0233972 | A1* | 9/2013 | Alderliesten | B32B 5/12 244/123.1 |
| 2013/0334364 | A1* | 12/2013 | Parker | B64C 9/22 244/99.3 |
| 2014/0209734 | A1* | 7/2014 | Okabe | B64C 9/22 244/99.3 |
| 2016/0083082 | A1* | 3/2016 | Bishop | B64C 9/16 244/213 |
| 2016/0137284 | A1 | 5/2016 | Turner et al. | |
| 2016/0167766 | A1* | 6/2016 | Brakes | B64C 9/00 244/99.2 |
| 2017/0073082 | A1* | 3/2017 | Ungar | B64D 45/0005 |

* cited by examiner

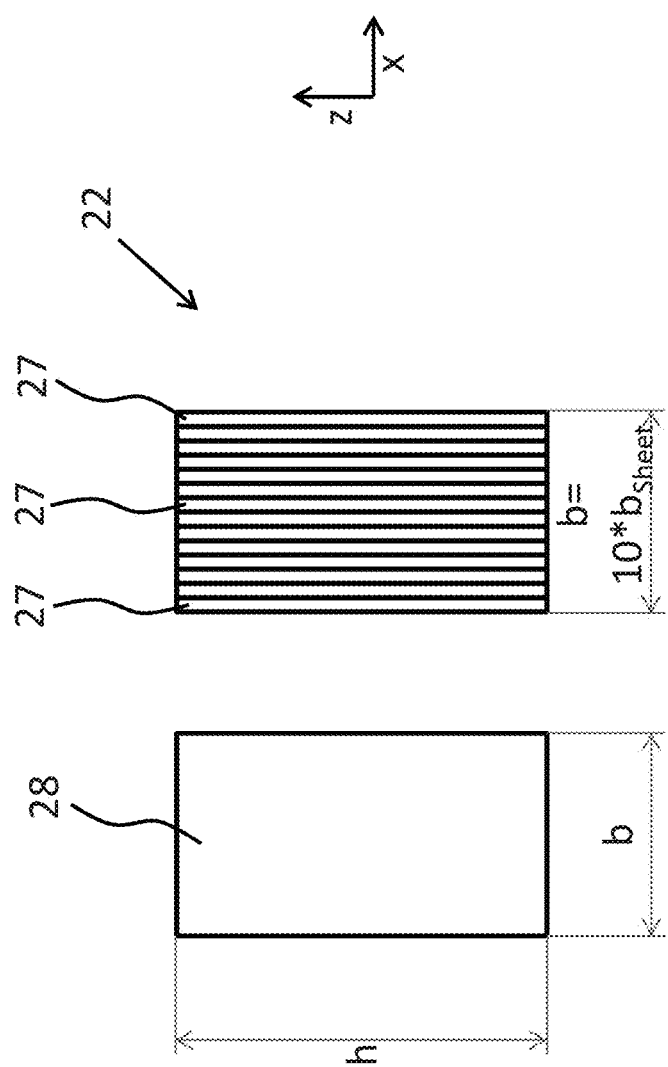

SLAT ASSEMBLY

CROSS-REFERENCES TO RELATED APPLICATIONS

This application claims the benefit of the European patent application No. 16200371.9 filed on Nov. 23, 2016, the entire disclosures of which are incorporated herein by way of reference.

BACKGROUND OF THE INVENTION

The present application relates to a leading edge slat assembly which is adapted to be mounted to a main wing of an aircraft and comprises a slat having a leading edge, two elongate slat tracks connected to the slats, wherein the two slat tracks are adapted to be mounted to a main wing of an aircraft such that they are selectively movable between a retracted position and an extended position to thereby move the slat between a stowed position and a deployed position, and a drive arrangement drivingly engaging the two slat tracks and operable to effect synchronous and parallel movement of the slat tracks between the retracted position and the extended position.

In order to be able to selectively vary the degree of lift provided by an aircraft wing, aircraft wings are typically provided with aerodynamic surfaces which are movably coupled to a main wing such that they can be moved between a stowed position, in which they are disposed within or directly on the main wing, and at least one deployed position, in which they are extended from the main wing. Slats are such movable aerodynamic surfaces disposed at and extendible from the leading edge of the main wing.

Slats are commonly mounted to the main wing by means of a plurality of elongate slat tracks. Each slat track is movable with respect to the main wing between a retracted position corresponding to the stowed position of the slat and an extended position corresponding to the deployed position of the slat. The movement of the slat tracks between the retracted and extended positions is effected by means of a drive arrangement. For example, such a drive arrangement may comprise a drive shaft, which is rotatably driven by a rotary actuator and which is coupled to each of the slat tracks via a respective transmission or gearbox converting the rotary movement of the drive shaft into a synchronous translatory movement of the slat tracks along their longitudinal extension.

The connection between the slat tracks and the slats is typically realized by joints, which comprise a plurality of spherical bearings, such that some degree of movement of the slat with respect to the slat tracks is possible. Further, whereas at least one of the joints is configured as a so-called master joint, which does not allow for lateral displacement between the slat and the respective slat track at the location of the joint, some of the other joints may be configured as so-called slave joints, which allow for such relative lateral displacement. Overall, the configuration of the joints is such that minor changes in the position and the geometry of the slat with respect to the slat tracks can be compensated for, so that there is at least some degree of decoupling between deformation of the slat and deformation of the main wing.

A relative change in the position of the slat with respect to the slat tracks may occur, for example, in the event that the slat tracks coupled to a single slat are not moved synchronously, i.e., in case of a differential movement of the slat tracks, resulting in skewing of the slat, and may be accommodated by the joints configured in the above manner. However, the arrangement of spherical bearings used in the joints, typically together with multiple links, is relatively complex and expensive and assumes a considerable amount of space.

SUMMARY OF THE INVENTION

It is therefore an object of the present invention to provide a slat assembly of the above type, in which a connection between a slat track and the slat is of a simple construction and has a small dimension and is nevertheless able to accommodate a skewing movement of the slat with respect to the slat track.

According to the present invention, a slat assembly or leading-edge slat assembly is provided with is adapted to be mounted to a main wing of an aircraft. The slat assembly comprises a slat having a leading edge, i.e., an edge constituting the forwardmost portion of the slat and facing incoming flow in use of the slat assembly. Generally, the slat typically also comprises an upper surface and a lower surface meeting at the leading edge.

The slat assembly further comprises two elongate slat tracks. Each of the slat tracks is extending along or in a respective plane. The two planes associated with the two slat tracks are parallel to and spaced from each other. They are defined in such a manner that, of all possible planes along or in which the two slat tracks extend, they are the planes having the maximum perpendicular distance from each other. The two slat tracks are connected, each at one longitudinal end thereof, to the slat at two locations spaced from each other in a direction perpendicular to the planes, so that they are spaced apart in a spanwise direction of the slat. For example, the slat tracks may extend from the slat in a rearward direction and may be connected to a lower surface of the slat. The two slat tracks are adapted to be mounted to a main wing of an aircraft such that they are selectively movable along their associated planes between a retracted position and an extended position to thereby move the slat between a stowed position and a deployed position with respect to the main wing and, in particular, a leading edge of the main wing. In the deployed position, the leading edge of the slat is at a greater distance from the leading edge of the main wing than in the stowed position. For example, in the stowed position, the leading edge of the main wing may be disposed within or in contact with a lower surface portion—in particular a concave portion—of the slat, so that the slat is stowed on the leading edge of the main wing.

Moreover, the slat assembly comprises a drive arrangement which drivingly engages the two slat tracks and is operable to effect synchronous and parallel movement of the slat tracks between the retracted position and the extended position thereof.

One or both of the two slat tracks is or are connected to the slat by a respective interconnection portion having the particular characteristics described below. Thus, for each of the two slat tracks, a separate such interconnection portion may be provided, or for only one of the two slat tracks, an interconnection portion as described below is provided, whereas the other of the two slat tracks is connected to the slat in a different manner or utilizing an element or portion having a configuration different from the configuration of the interconnection portion described below. Each interconnection portion extends between its associated slat track or a part or portion of the slat track and the slat or a part or portion of the slat and comprises a first portion secured to or integrally formed with the slat and a second portion, which is spaced from the first portion and is secured to or integrally formed with the respective slat track. In a case of the first portion being integrally formed with the slat, the interconnection portion is an integral part of the slat. Similarly, in a case of the second portion being integrally formed with the slat track, the interconnection portion is an integral part of the respective slat track. Preferably, the first portion is secured to or integrally formed with the slat and the second portion is secured to or integrally formed with the slat track, such that a relative rotation between the respective portion of the interconnection portion, on the one hand, and the slat and the slat track, respectively, on the other hand, is not possible. In any case, the first and second portions of the interconnection portion are spaced from each other in a direction along the plane of the respective slat track. Preferably, the interconnection portion extends along the plane when viewed from the first portion in the direction of the second portion. Further, the interconnection portion preferably includes one or more components or elements, which are each configured in one piece, and each of which extends between the slat track associated with the respective interconnection portion or a part or portion of that slat track and the slat or a part or portion of the slat and is secured to or integrally formed with the slat and is secured to or integrally formed with the respective slat track.

Each of the interconnection portions is elastically deformable and is constructed in such a manner that a first stiffness against deformation—and in particular bending—about a first axis, which extends perpendicular to the planes, is at least ten times a second stiffness against deformation—and in particular torsional deformation—about a second axis, which extends perpendicularly to the first axis and between the first and second portions of the interconnection portion, and at least ten times a third stiffness against deformation—and in particular bending—about a third axis, which extends perpendicularly to the first and second axes. In this manner, the respective interconnection portion provides for a high stiffness against rotation of the slat with respect to the slat track about an axis perpendicular to the planes or transverse to a spanwise direction of the slat, but is able to readily deform to allow both for a relative torsional movement between slat and slat track and for a rotation of the slat with respect to the slat track in the direction perpendicular to the planes or in a direction of the leading edge of the slat.

Therefore, the slat assembly is adapted to rigidly retain the slat on a main wing at a desired pitch angle, but is nevertheless able to accommodate forces and allow for relative movement occurring upon skewing of the slat. Different from the prior art solutions, this does not require or is not achieved by way of spherical bearings and link arrangements, but is achieved by means of a particular elastic coupling between the slat track and the slat providing specific different degrees of stiffness against deformation and movement about different axes. As compared to arrangements utilizing multiple spherical bearings, which can be completely avoided in the present slat assembly, the interconnection portion is of a much simpler and cost-efficient construction. Further, the interconnection portion can be realized with considerably smaller dimensions, so that cutouts in the skin of the leading edge of a main wing, to which the slat assembly is mounted, may likewise be of a smaller size. Such cutouts are necessary to allow the connection region between slat track and slat to pass into the interior of the main wing. Consequently, the main wing can be configured to be aerodynamically more efficient in the deployed position of the slat.

In a preferred embodiment, the first stiffness is at least twenty times, 25 times, 30 times, 35 times, 40 times, 45 times or 50 times the second stiffness. Additionally or separately, in a preferred embodiment the first stiffness is at least twenty times, 25 times, 30 times, 35 times, 40 times, 45 times or 50 times the third stiffness.

Generally, the second and third stiffnesses may be equal or approximately equal, or the second stiffness may be larger or smaller than the third stiffness. The relative values for the second and third stiffnesses may be chosen depending on the particular application or depending on constructional considerations.

In a preferred embodiment, the interconnection portion is an interconnection element separate from the slat and from the respective slat track, i.e., the interconnection element is not integrally formed with and does not constitute part of either of the slat track and the slat, but is a separate component or element secured to the slat and to the slat track.

In an alternative preferred embodiment, the interconnection portion is an integral part of the slat and separate from the respective slat track, or the interconnection portion is an integral part of the respective slat track and separate from the slat.

In a preferred embodiment, each of the interconnection portions comprises a plurality of plates, which are preferably planar and may be made, e.g., of sheet metal. The plates have two opposite extended surfaces and are disposed one on top of the other such that extended surfaces of adjacent ones of the plates face each other and the plates form a stack or part of a stack. One, two or more or all of these plates extends or extend between the slat and the respective slat track and comprises or comprise a first portion secured to the slat and a second portion, which is spaced from the first portion and secured to the slat track. The first portion and the second portion of this plate or these plates correspond to the first portion and the second portion, respectively, of the interconnection portion. In case not all of the plates extend between the slat and the respective slat track, the respective plates may be secured to the plates extending between the slat and the slat track by suitable means. In any case, all of the plates are arranged such that their extended surfaces are extending perpendicularly to the first axis. Thus, deformation about the first axis corresponds to deformation in the planes defined by each of the plates, so that the plates provide particularly high resistance against this type of deformation. As compared to a solid block of material, a stack of a plurality of individual plates provides for much lower stiffness against deformation about the second and third axes. The stiffness of a rectangular piece of material against deformation about an axis is approximately proportional to $b^3$ with b being the width of the piece of material in a direction perpendicular to the axis. Therefore, for example, when comparing a solid block of material with a stack of ten plates of equal thickness, wherein the stack has the same outer dimensions as the solid block, the stiffness of each of the plates against bending about an axis extending in the plane defined by the respective plate is about $1/1000$ of the corresponding stiffness of the solid block, so that the total stiffness of the stack is about $1/100$ of the corresponding stiffness of the solid block. The torsional stiffness is likewise considerably reduced by the stack configuration.

In this embodiment, it may be advantageous to dispose a liner between each two adjacent ones of the plates, which liner is configured such that friction between adjacent ones of the plates is lower than in the case of a direct contact between these plates. Alternatively or additionally, in case the interconnection portion is not integrally formed with the slat and/or with the slat track, it may be advantageous if the interconnection portion is secured to the slat and to the respective slat track, respectively, by means of respective fastening elements, such as bolts, extending through the stack and through bores in the plates, wherein the bores are dimensioned such that there is a clearance between the fastening elements and the plates. Both of these options may serve to minimize interaction between the individual plates and to thereby assure the desired decrease of stiffness as compared to a solid block of material. In the case of providing for clearance between the plates and fastening elements force transfer between the fastening elements and the stack of plates may be effected by means of bushings, which may be provided, e.g., on both sides of the stack between the stack on the one hand and the slat and the slat track, respectively, on the other hand.

In an alternative preferred embodiment, the interconnection portion has a cross-shaped, I-beam-shaped or H-shaped configuration with at least four legs, wherein two legs of the interconnection portion are secured to or integrally formed with the slat and two other legs of the interconnection portion are secured to or integrally formed with the slat track.

In a preferred embodiment, the slat comprises an upper surface, a lower surface, a concave portion provided in the lower surface and extending from a lower edge region of the slat, and, for each interconnection portion, a lug which extends from the lower edge region of the slat inside the concave portion. Each of the interconnection portions is secured to or integrally formed with the associated lug. In case of the interconnection portion being separate from the lug, the interconnection portion is preferably directly secured to the lug, e.g., by means of a bolt connection.

In a preferred embodiment, the drive arrangement comprises a separate drive means or actuator for each of the two slat tracks, such as a separate rotary actuator, e.g., including an electric or hydraulic motor. In this case, a skewing condition may occur, e.g., if the separate drive means or actuators do not operate synchronously. Alternatively, the drive arrangement comprises a common drive shaft and a common drive means or rotary actuator operable to rotate the drive shaft, wherein the drive shaft is coupled to each of the two slat tracks via an associated transmission mechanism or gearbox. In this case, a skewing condition may occur, e.g., if one of the transmission mechanisms or gearboxes jams, but the common drive shaft is continued to be rotated by the rotary actuator, so that the other transmission mechanism or gearbox continues to transfer motion to the associated slat track.

In a preferred embodiment, the slat tracks are curved, thereby providing for forward and downward movement of the slat with respect to the main wing upon moving the slat from the stowed position into the extended position. However, the slat tracks may also be straight.

According to the present invention, a wing of an aircraft is also provided, which wing comprises a main wing and a slat assembly having the above-described configuration. The two slat tracks are mounted to the main wing, thereby mounting the slat assembly to the main wing in the manner already described above. The drive arrangement is operable to move the slat with respect to the main wing between the stowed position and the deployed position. Preferably, the two planes along which the slat tracks extend are perpendicular to a front spar of the main wing.

The present invention also provides an aircraft comprising such a wing.

BRIEF DESCRIPTION OF THE DRAWINGS

In the following an exemplary embodiment of the slat assembly and of a wing including the slat assembly will be described in more detail with reference to the drawings.

FIG. 4 shows a comparison between an interconnection portion constituted by a solid block of material and a stack of multiple plates having the same overall dimensions.

DETAILED DESCRIPTION OF THE PREFERRED EMBODIMENTS

Figure 1:
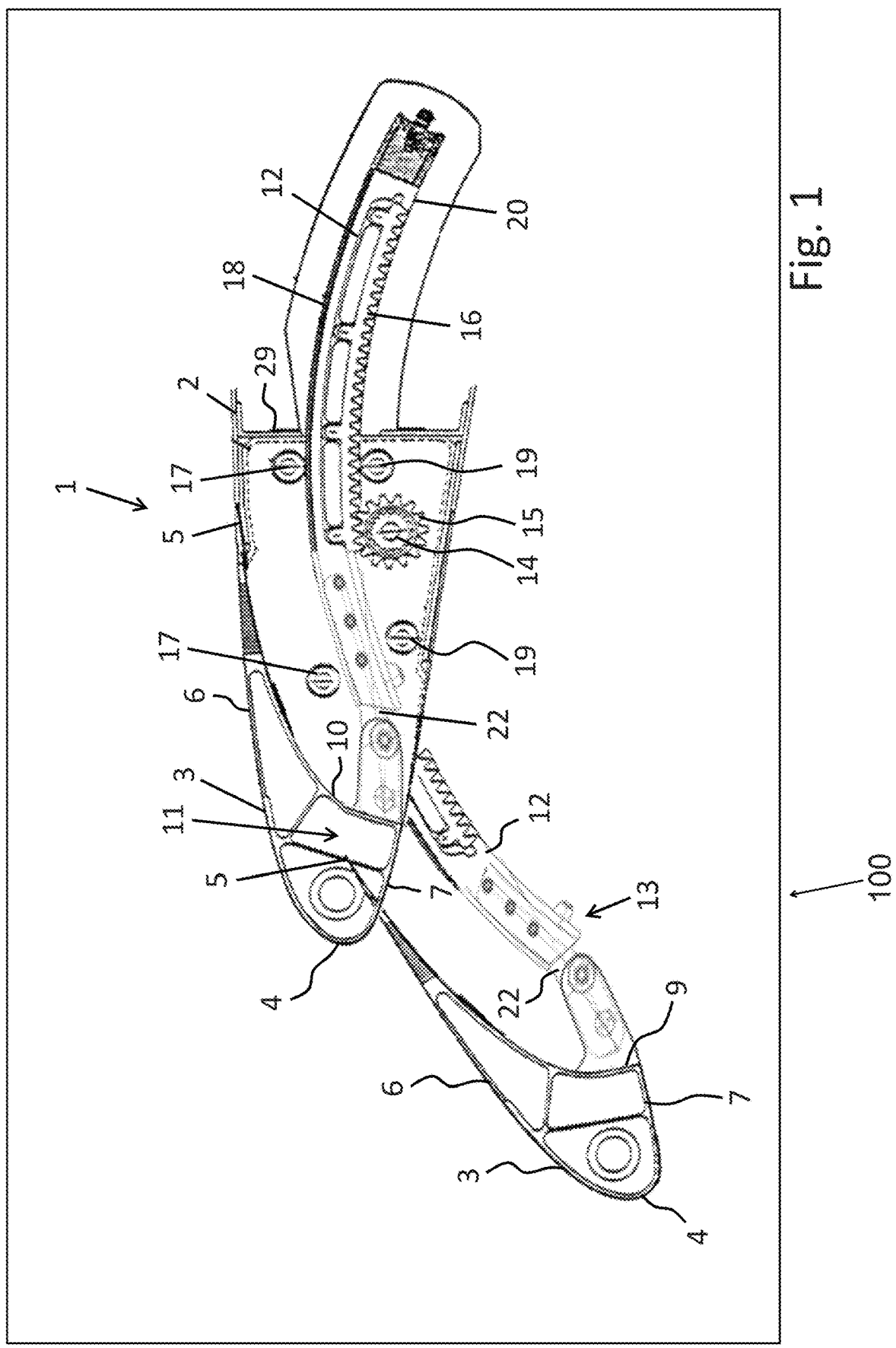
FIG. 1 shows a schematic partial side cross-sectional view of a wing of an aircraft comprising a slat assembly according to the invention, wherein the slat is shown both in the stowed position and in the deployed position.

In FIG. 1 a wing 1 of an aircraft 100 is shown. The wing 1 comprises a main wing 2 and a slat 3. The slat 3, which is illustrated both in a stowed position, in which it is in contact with the main wing 2, and a deployed position, in which it is extended from and spaced apart from the main wing 2, comprises a leading edge 4 and a trailing edge 5, both extending in the spanwise direction of the slat 3, i.e., in FIG. 1 in a direction perpendicular to the plane of the drawing. In operation, the leading edge 4 faces the air flow. The slat 3 further comprises an upper surface 6 and a lower surface 7, each extending between the leading edge 4 and the trailing edge 5. The lower surface 7 comprises a concave portion 8 which is delimited towards the leading edge 4 by a lower edge region 9.

The main wing 2 likewise comprises a leading edge 10, and in the stowed position the leading edge 10 of the main wing 2 is received in the concave portion 8 in the lower surface 7 of the slat 3 such that the slat 3 is stowed on the leading edge 10 of the main wing 2. In this regard, the stowed position may be such that the main wing 2 is in contact with the lower surface 7 of the slat 3 in the region of the concave portion 8. By contrast, in the deployed position the slat 3 is spaced forwardly and downwardly from the leading edge 10 of the main wing 2. In the illustrated example, a slot 11 exists between the trailing edge 5 of the slat 3 and the leading edge 10 of the main wing 2, allowing for air flow from the lower side of the wing 1 to the upper side of the wing 1.

The slat 3 is mounted to the main wing 2 by means of two elongate arcuate slat tracks or support elements 12, which are extending parallel to each other and are spaced from each other in the spanwise direction of the slat 3, so that only one of the slat tracks 12 is visible in the cross-sectional view of FIG. 1. More specifically, each of the slat tracks 12 extends in and defines a respective plane, wherein the plane in which the slat track 12 visible in FIG. 1 extends is the plane of the drawing. The two planes associated with the two slat tracks 12 are parallel to each other. A distal end 13 of each of the slat tracks 12 is connected to the slat 3 at the lower edge region 9 thereof. The slat tracks 12 each extend into the main wing 2 and are mounted in the main wing 2 to be movable along an arc in the respective planes and defined by the arcuate shape of the slat track 12 between a retracted position, in which the slat 3 is in its stowed position, and an extended position, in which the slat 3 is in its deployed position.

For effecting the movement of the slat tracks 12 between the retracted and extended positions a rotatable drive shaft 14 is provided, which extends in the spanwise direction of the slat 3 and is driven by a rotary actuator (not shown). For each of the slat tracks 12 a pinion 15 is fixedly mounted on the drive shaft 14, which pinion 15 engages a toothed rack portion 16 of the respective slat track 12. Consequently, when the drive shaft 14 is driven to rotate, the pinions 15 rotate together with the drive shaft 14 and cooperate with the rack portions 16 to selectively move the slat tracks 12 together between the retracted and extended positions.

Each of the slat tracks 12 is supported between a plurality of upper rollers 17 in contact with an upper surface 18 of the respective slat track 12 and a plurality of lower rollers 19 in contact with a lower surface 20 of the respective slat track 12, wherein each of the rollers 17, 19 is rotatable about an axis extending in a direction perpendicular to the two planes associated with the two slat tracks 12 and parallel to a front spar 29 of the main wing 2. In this manner, the rollers 17, 19 are effective to guide the movement of the slat tracks 12 between the retracted and extended positions thereof and to support them against vertical loads occurring during operation of the wing 1. In effect, the shape and movement path of the slat tracks 12 defines a hinge line for the movement of the slat 3, and the hinge line likewise extends perpendicularly to the planes associated with the two slat tracks 12.

Figure 2:
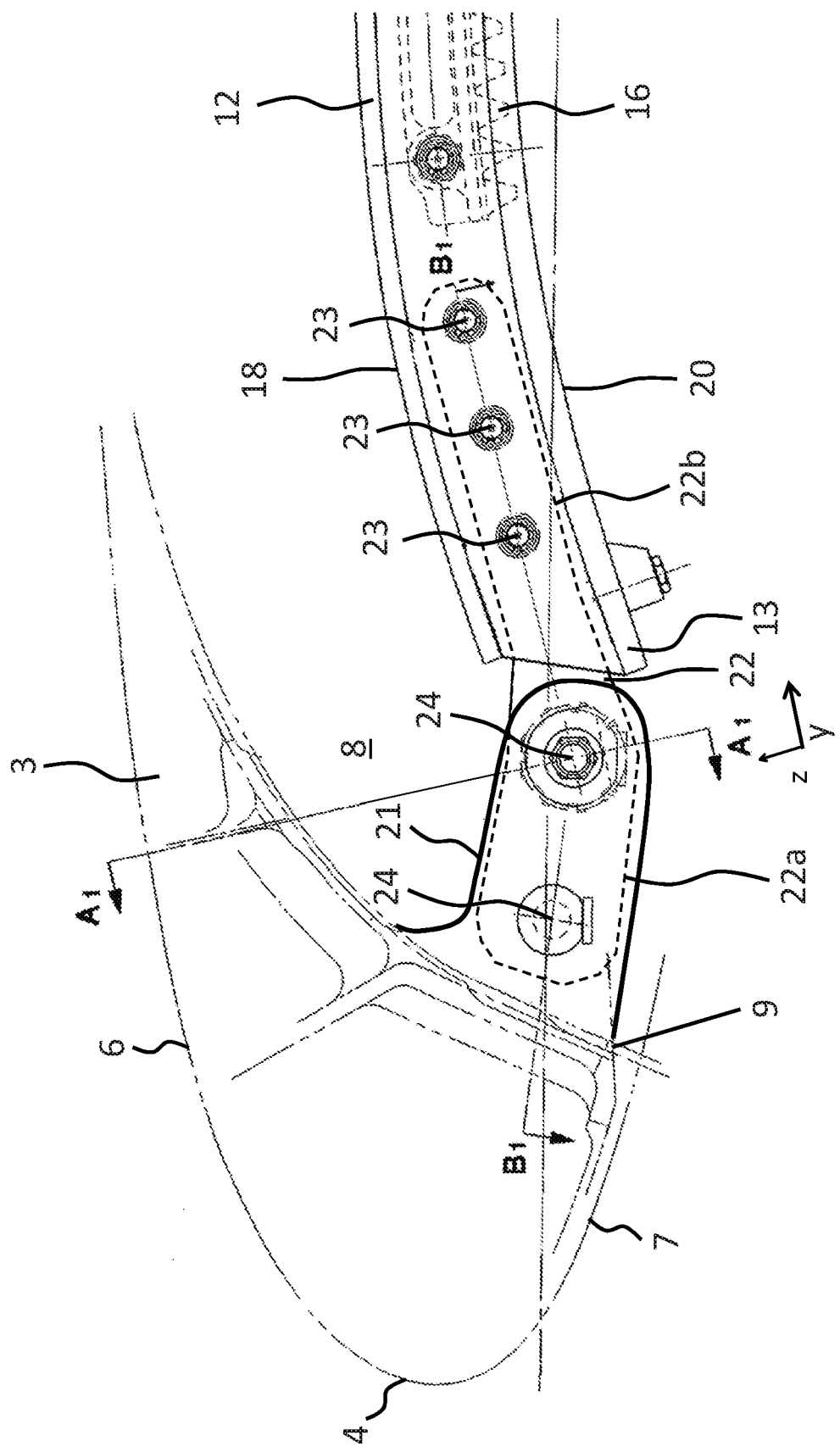
FIG. 2 shows a more detailed view of the slat assembly of FIG. 1.

As can be seen in FIG. 2, which shows a more detailed view of the slat 3 and an adjacent portion of one of the slat tracks 12 of FIG. 1, a lug 21 extends from the lower edge region 9 in a direction away from the leading edge 4, and the distal end 13 of the slat track 12 is connected to the lug 21 by means of an interconnection portion 22, which, in the illustrated example, is provided in the form of an interconnection element separate from the slat 3 and lug 21 on the one hand and the slat track 12 on the other hand. The interconnection element 22 extends between the slat track 12 and the lug 21 and is secured at one end portion 22b thereof to the slat track 12 by means of a plurality of spaced bolts 23 and at another opposite end portion 22a thereof to the lug 21 by means of a plurality of spaced bolts 24. Consequently, the interconnection element 22 is not able to rotate with respect to either the lug 21 or the slat track 12. As can be seen from the Figure the lug 21 may have a simple shape and be of small size, and the bolt connection between the lug 21 and the interconnection element 22 likewise does not require a lot of space. Therefore, a cutout in the main wing 2, which is required for allowing the connection region between the slat track 12 and the slat 3 to be retracted into the main wing 2 in the stowed position of the slat 3 (see FIG. 1), can be of small size, so that the main wing 2 has an aerodynamically efficient configuration in the deployed position of the slat 3.

Figure 3:
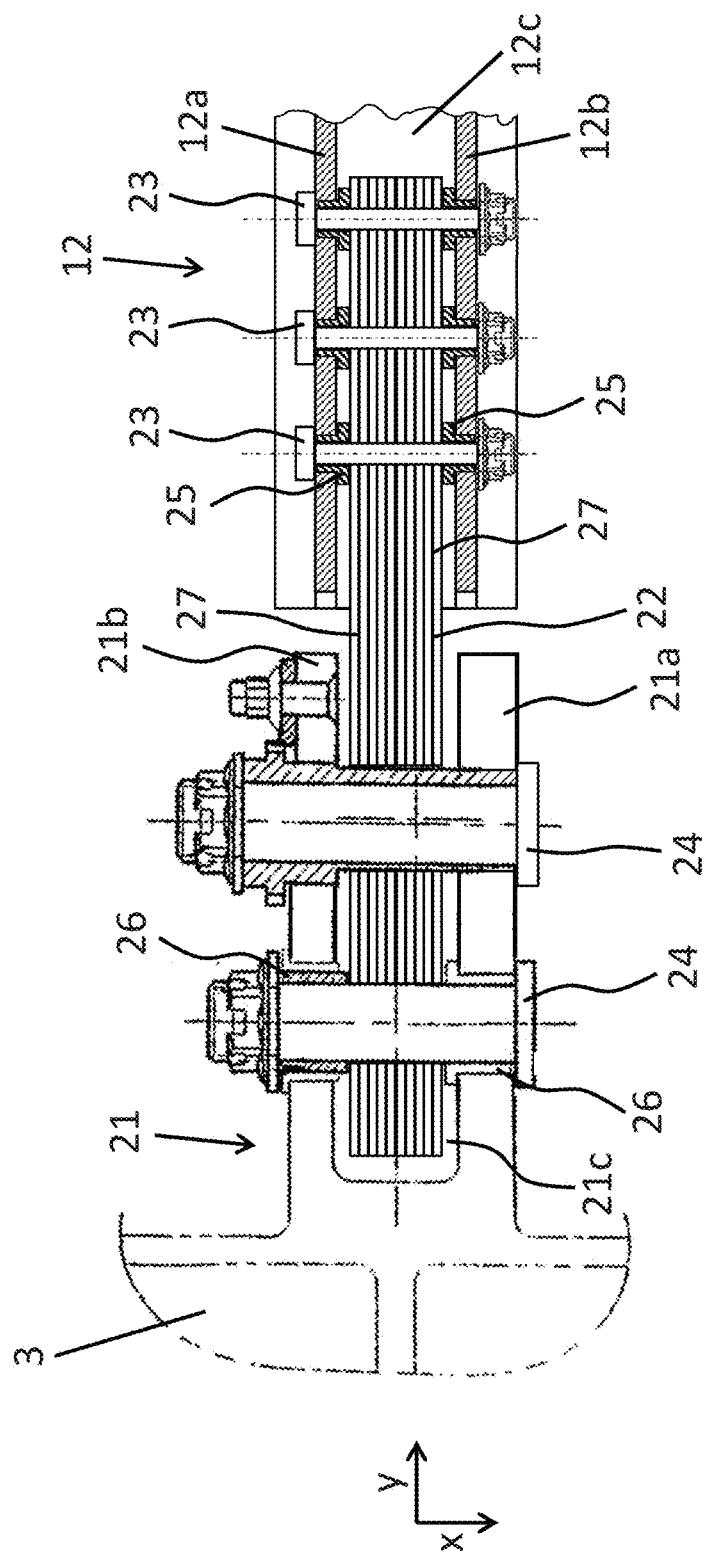
FIG. 3 shows a top partial cross-sectional view of the components illustrated in FIG. 2.

FIG. 3 shows a top partially cross-sectional view of the components illustrated in FIG. 2. As can be seen in the Figure, the lug 21 comprises two parallel spaced walls 21a, 21b defining between them an interior space 21c, and the slat track 12 likewise comprises two parallel spaced walls 12a, 12b defining between them an interior space 12c. The two opposite end portions 22b, 22a of the interconnection element 22 secured by the bolts 23 and the bolts 24 to the slat track 12 and the lug 21, respectively, are disposed inside the interior space 12c and 21c, respectively. Each of the bolts 23 extends through both of the walls 12a, 12b and through the interconnection element 22, and for each of the bolts 23 two bushings 25 are provided on opposite sides of the interconnection element 22 between the interconnection element 22 and the respective wall 12a and 12b, respectively, so that load transfer between the track slat 12 and the interconnection element 22 in the spanwise direction x of the slat 3 (see the arrow in FIG. 3) is ensured.

Similarly, each of the bolts 24 extends through both of the walls 21a, 21b and through the interconnection element 22. However, in the case illustrated in FIG. 3, only for one of the two bolts 24 two bushings 26 are provided on opposite sides of the interconnection element 22 between the interconnection element 22 and the respective wall 21a and 21b, respectively, in order to effect load transfer between the lug 21 and the interconnection element 22 in the direction x of the slat 3, which direction x extends perpendicularly with respect to the two planes associated with the two track slats 12 or, preferably, parallel to the front spar 29 or the hinge line. By contrast, for the other bolt 24 such bushings 26 are not provided, so that the respective bolt 24 is capable of some relative movement with respect to the interconnection element 22 and the load transfer between the lug 21 and the interconnection element 22 in the x-direction is considerably reduced. This configuration corresponds to a so-called slave configuration in which some lateral movement in the spanwise direction of the slat 3 is possible between the slat 3 and the slat track 12. For the other slat track 12, a master configuration is provided in which the bushings 26 are provided for both bolts 24, so that load transfer between the lug 21 and the interconnection element 22 in the direction x of the slat 3 is ensured and a relative lateral movement is prevented.

Importantly, the interconnection element 22 comprises a plurality of parallel planar plates 27 (only two of which are designated by the reference numeral 27 in FIG. 3), which are stacked one on top of the other to form a stack. The stack and the individual plates 27 are oriented such that their planar opposite extended surfaces 27a, 27b (see the schematic cross-sectional view of the interconnection element 22 in FIG. 4) are extending perpendicularly with respect to the direction x, i.e., the direction perpendicular to the two planes associated with the two slat tracks 12.

FIG. 4 shows a schematic cross-sectional view of the interconnection element 22 in comparison with a solid block of material 28 having the same overall dimensions, i.e., height h and width b. The interconnection element 22 comprises ten stacked plates 27, each of which has a width of bsheet=b/10. Due to the fact that the stiffness against bending about an axis z (see the arrows in FIGS. 2 and 4) which is extending in the plane of FIG. 4 and is extending in the vertical direction of FIG. 4, i.e., parallel to the plane defined by the plates 27, is approximately proportional to b (in the case of the solid block 28) and bsheet in the case of the individual plates 27, the stiffness against this type of bending of the solid block 28 is about 1000 times the stiffness of an individual one of the plates 27. The stiffness against torsional deformation about an axis y (see the arrow in FIGS. 2 and 3) extending perpendicularly to the plane of FIG. 4 is considerably reduced in a similar manner, although not quite as much as the stiffness against bending about the axis z.

In the stack of plates 27 the plates 27 are somewhat decoupled from each other, so that the total stiffness of the stack of plates 27 is only about 10 times the stiffness of the individual plates 27 and therefore, e.g., in the case of deformation about the axis z, about 1/100 the stiffness of the solid block 28. In order to enhance the decoupling of the individual plates 27 a liner may be provided between adjacent plates 27 and/or a clearance may be provided between the outer circumferential surfaces of the bolts 23, 24 and the interior sidewalls of the corresponding bores through the plates 27. By contrast, the stiffness against bending about the axis x is hardly different between the stack of plates 27 and the solid block 28.

Due to this particular configuration of the interconnection element 22, which provides it with high stiffness against deformation about the axis x, i.e., an axis extending perpendicularly to the two planes associated with the two slat tracks 12 or parallel to the front spar 29 or the hinge line, is considerably higher than the stiffness both against torsional deformation about the axis y, i.e., an axis extending between the two opposite portions of the interconnection element 22 secured to the slat track 12 and the lug 21, and deformation about the axis z. Therefore, the interconnection element 22 secures the slat 3 to the slat track 12 while securely retaining the slat 3 at a predetermined pitch angle, but at the same time allowing for elastic deformation to enable to accommodate forces occurring when the slat 3 is skewed with respect to the main wing 2, for example in case one of pinions 15 jams so that the respective slat track 12 is not moved synchronously with the other slat track 12.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A slat assembly adapted to be mounted to a main wing of an aircraft and comprising:
   a slat having a leading edge,
   two elongate slat tracks, each extending along a respective plane, wherein the two planes are parallel to and spaced from each other and, of all possible planes along which the two slat tracks extend, are the planes having the maximum perpendicular distance from each other, wherein the slat tracks are connected to the slat at two locations spaced from each other in a direction perpendicular to the planes, wherein the two slat tracks are adapted to be mounted to a main wing of an aircraft such that they are selectively movable along the associated plane between a retracted position and an extended position to thereby move the slat between a stowed position and a deployed position, and
   a drive arrangement drivingly engaging the two slat tracks and operable to effect synchronous and parallel movement of the slat tracks between the retracted position and the extended position,
      the connection between the slat and one or both of the slat tracks being realized by a respective interconnection portion, which extends between at least part of the slat and at least part of the respective slat track and comprises a first portion secured to or integrally formed with the slat and a second portion secured to or integrally formed with the respective slat track, wherein the first and second portions are integrally formed and spaced from each other along the plane of the respective slat track,
      the interconnection portion being elastically deformable such that a first stiffness against deformation about a first axis, wherein the first axis extends perpendicular to the planes, is at least ten times a second stiffness against deformation about a second axis, wherein the second axis extends perpendicularly to the first axis and between the first and second portions of the interconnection portion, and at least ten times a third stiffness against deformation about a third axis, wherein the third axis extends perpendicularly to the first and second axes such that the interconnection portion is configured to rigidly retain the slat at a predetermined pitch angle while allowing for relative movement about the third axis when the slat is skewed with respect to the main wing.

2. The slat assembly according to claim 1, wherein the first stiffness is at least 25 times the second stiffness.

3. The slat assembly according to claim 1, wherein the first stiffness is at least 25 times the third stiffness.

4. The slat assembly according to claim 1, wherein the first stiffness is at least 50 times the second stiffness.

5. The slat assembly according to claim 1, wherein the first stiffness is at least 50 times the third stiffness.

6. The slat assembly according to claim 1, wherein the interconnection portion is an interconnection element separate from the slat and from the respective slat track.

7. The slat assembly according to claim 1, wherein the interconnection portion is an integral part of the slat and separate from the respective slat track.

8. The slat assembly according to claim 1, wherein the interconnection portion is an integral part of the respective slat track and separate from the slat.

9. The slat assembly according to claim 1, wherein the interconnection portion comprises a plurality of plates having two opposite extended surfaces and disposed one on top of the other such that extended surfaces of adjacent plates face each other and the plates form a stack,
   wherein at least one of the plates extends between the slat and the respective slat track and comprises a first portion secured to the slat and a second portion secured to the slat track, and
   wherein the extended surfaces of the plates are perpendicular to the first axis.

10. The slat assembly according to claim 9, wherein a liner is disposed between each two adjacent one of the plates, wherein the liner is configured such that friction between adjacent plates is lower than in the case of a direct contact between adjacent plates.

11. The slat assembly according to claim 9, wherein the interconnection portion is secured to the slat and to the respective slat track by means of a respective fastening element extending through the stack and through bores in the plates, wherein the bores are dimensioned such that there is a clearance between the fastening element and the plates.

12. The slat assembly according to claim 1, wherein the slat comprises an upper surface, a lower surface, a concave portion provided in the lower surface and extending from a lower edge region of the slat, and, for each interconnection portion, a lug which extends from the lower edge region of the slat inside the concave portion, wherein the interconnection portion is secured to or integrally formed with the lug.

13. The slat assembly according to claim 12, wherein the interconnection portion is directly secured to the lug.

14. The slat assembly according to claim 1, wherein the drive arrangement comprises a separate drive means for each of the two slat tracks.

15. The slat assembly according to claim 1, wherein the drive arrangement comprises a common drive shaft and a common drive means operable to rotate the drive shaft, wherein the drive shaft is coupled to each of the two slat tracks via an associated transmission mechanism.

16. A wing of an aircraft comprising a main wing and a slat assembly according to claim 1 mounted to the main wing by means of the two slat tracks such that the drive arrangement is operable to move the slat with respect to the main wing between the stowed position and the deployed position.

17. An aircraft comprising a wing according to claim 16.

* * * * *